US010094629B2

(12) United States Patent
Otsuki et al.

(10) Patent No.: US 10,094,629 B2
(45) Date of Patent: Oct. 9, 2018

(54) ALUMINUM ALLOY CLAD MATERIAL AND HEAT EXCHANGER THAT INCLUDES TUBE OBTAINED BY FORMING THE CLAD MATERIAL

(71) Applicants: DENSO CORPORATION, Kariya-shi, Aichi (JP); UACJ CORPORATION, Chiyoda-ku, Tokyo (JP)

(72) Inventors: Shusuke Otsuki, Kariya (JP); Shoei Teshima, Kariya (JP); Kouichi Nakashita, Kariya (JP); Kouta Hagihara, Kariya (JP); Toshikazu Tanaka, Tokyo (JP); Ryoko Fujimura, Tokyo (JP); Naoki Yamashita, Tokyo (JP); Hirokazu Tanaka, Tokyo (JP)

(73) Assignees: DENSO CORPORATION, Kariya-shi, Aichi (JP); UACJ CORPORATION, Chiyoda-ku, Tokyo (JP)

(*) Notice: Subject to any disclaimer, the term of this patent is extended or adjusted under 35 U.S.C. 154(b) by 527 days.

(21) Appl. No.: 14/442,520

(22) PCT Filed: Nov. 12, 2013

(86) PCT No.: PCT/JP2013/080522
§ 371 (c)(1),
(2) Date: May 13, 2015

(87) PCT Pub. No.: WO2014/077237
PCT Pub. Date: May 22, 2014

(65) Prior Publication Data
US 2016/0290743 A1    Oct. 6, 2016

(30) Foreign Application Priority Data
Nov. 13, 2012 (JP) .................................. 2012-249030
Nov. 7, 2013 (JP) .................................. 2013-231059

(51) Int. Cl.
C22C 21/00 (2006.01)
B32B 15/01 (2006.01)
(Continued)

(52) U.S. Cl.
CPC ........ *F28F 19/004* (2013.01); *B23K 35/0238* (2013.01); *B23K 35/288* (2013.01);
(Continued)

(58) Field of Classification Search
CPC .... B23K 35/0238; B32B 15/016; C22C 21/00
See application file for complete search history.

(56) References Cited

U.S. PATENT DOCUMENTS 4,991,647 A   2/1991  Kawabe et al.
8,216,693 B2  7/2012  Matsukado et al.
(Continued)

FOREIGN PATENT DOCUMENTS

CN   1982047 A    6/2007
EP   1 795 294 A1  6/2007
(Continued)

OTHER PUBLICATIONS

Search Report of European Patent Office issued in Application No. 13854258 dated Jun. 27, 2016 (5 pages).
(Continued)

*Primary Examiner* — George Wyszomierski
*Assistant Examiner* — Janell C Morillo
(74) *Attorney, Agent, or Firm* — Flynn Thiel, P.C.

(57) ABSTRACT

An aluminum alloy clad material includes a core material, an inner cladding material, and a sacrificial anode material, one side of the core material being clad with the inner cladding material, the other side of the core material being clad with the sacrificial anode material, the core material being formed of an Al—Mn alloy that includes 0.6 to 2.0 mass % of Mn and 0.4 mass % or less of Cu, with the balance being
(Continued)

aluminum and unavoidable impurities, the inner cladding material being formed of an Al—Mn—Cu alloy that includes 0.6 to 2.0 mass % of Mn and 0.2 to 1.5 mass % of Cu, with the balance being aluminum and unavoidable impurities, and the sacrificial anode material being formed of an Al—Zn alloy that includes 0.5 to 10.0 mass % of Zn, with the balance being aluminum and unavoidable impurities.

17 Claims, 3 Drawing Sheets

(51) Int. Cl.
    *F28F 19/00*     (2006.01)
    *C22C 21/10*     (2006.01)
    *F28F 19/06*     (2006.01)
    *F28F 21/08*     (2006.01)
    *B23K 35/28*     (2006.01)
    *B23K 35/02*     (2006.01)

(52) U.S. Cl.
    CPC ............ *B32B 15/016* (2013.01); *C22C 21/00* (2013.01); *C22C 21/10* (2013.01); *F28F 19/06* (2013.01); *F28F 21/084* (2013.01); *F28F 21/089* (2013.01); *B32B 2597/00* (2013.01)

(56) References Cited

U.S. PATENT DOCUMENTS

2009/0162686 A1     6/2009     Matsukado et al.
2011/0240280 A1     10/2011     Izumi et al.

FOREIGN PATENT DOCUMENTS

| | | |
|---|---|---|
| EP | 2 075 083 A1 | 7/2009 |
| JP | 2000-26931 A | 1/2000 |
| JP | 2004-225062 A | 8/2004 |
| JP | 2007-247021 A | 9/2007 |
| JP | 2008-240084 A | 10/2008 |
| JP | 2009-127121 A | 6/2009 |
| JP | 2009-155673 A | 7/2009 |
| JP | 2011-224656 A | 11/2011 |

OTHER PUBLICATIONS

Office Action of Chinese Patent Office issued in Application No. 201380058877X with English translation (12 pages).

ALUMINUM ALLOY CLAD MATERIAL AND HEAT EXCHANGER THAT INCLUDES TUBE OBTAINED BY FORMING THE CLAD MATERIAL

TECHNICAL FIELD

The present invention relates to an aluminum alloy clad material. More particularly, the invention relates to an aluminum alloy clad material that can produce a heat exchanger tube that exhibits an excellent outer-side corrosion resistance when formed into a tube. The invention also relates to a heat exchanger that includes a tube obtained by forming the clad material.

BACKGROUND ART

An aluminum alloy extruded tube or a tube obtained by bending an aluminum alloy sheet material has been used as a refrigerant tube (refrigerant passage) for an aluminum heat exchanger that is joined by brazing. Such a refrigerant tube is designed so that a sacrificial anode effect due to a Zn diffusion layer is achieved by thermally spraying Zn onto the side of the extruded tube that forms the outer side of the refrigerant tube, or cladding the side of the tube (obtained by bending an aluminum alloy sheet material) that forms the outer side of the refrigerant tube with an Al—Zn-based alloy (sacrificial anode material) in order to improve the corrosion resistance of the outer side (that comes in contact with the atmosphere) of the refrigerant tube.

In recent years, a reduction in thickness and an improvement in corrosion resistance have been required for materials used to produce an automotive heat exchanger, and a decrease in corrosion rate of the sacrificial anode layer through a reduction in Zn content in the sacrificial anode material, and an increase in thickness of the sacrificial anode layer have been desired. However, it is difficult to reduce the amount of Zn thermally sprayed to the extruded tube from the viewpoint of thermal spraying efficiency. When using the tube obtained by bending an aluminum alloy sheet material, since the potential of the sacrificial anode material increases due to the effects of the diffusion of Cu included in the core material (Al—Mn—Cu-based alloy), and it is difficult to achieve a potential difference sufficient to obtain the sacrificial anode effect when the amount of Zn is reduced, it is difficult to reduce the Zn content in the sacrificial anode material (see FIG. 3). It is difficult to increase the thickness of the sacrificial anode layer by increasing the cladding ratio from the viewpoint of production cost.

A brazing sheet that is provided with a potential gradient so that the potential increases from the outer side toward the inner side after brazing by increasing the Cu content in the filler metal situated on the inner side as compared with the core material, a brazing sheet that is designed so that the potential increases from outer side toward the inner side through a concentration gradient of Zn and Cu that is formed by adding Zn to the filler metal situated on the outer side, adding Cu to the filler metal situated on the inner side, and adjusting the ratio of Zn to Cu within a specific range, have been proposed. However, since a layer that is formed by Cu diffused from the filler metal and has a higher potential is thin, and the potential difference between the layer having a higher potential and the core material is small, most of the core material is consumed due to corrosion, and the effect of suppressing the occurrence of a through-hole is insufficient immediately before a through-hole occurs.

An aluminum alloy clad material that is designed so that the inner layer (that is situated on the inner side of a heat exchanger and comes in contact with a refrigerant) is prevented from melting during brazing by adjusting the Si content in the inner layer to 1.5% or less, has also been proposed. However, since the Cu content in the core material is high, Cu diffuses into the outer layer during brazing, and causes the sacrificial anode effect of the outer layer to deteriorate. Moreover, since the potential of the core material is significantly higher than that of the outer layer, the outer layer is consumed at an early stage.

RELATED-ART DOCUMENT

Patent Document

Patent Document 1: JP-A-2011-224656
Patent Document 2: JP-A-2009-127121
Patent Document 3: JP-A-2007-247021
Patent Document 4: JP-A-2008-240084

SUMMARY OF THE INVENTION

Technical Problem

The inventors of the invention have conducted experiments and studies with regard to the effects of the configuration of an aluminum alloy clad material that forms a tube obtained by bending an aluminum alloy sheet material, and the alloy composition of each layer of the clad material, on corrosion resistance. As a result, the inventors found that, when the aluminum alloy clad material that forms the tube has a three-layer structure that includes a core material, a sacrificial anode material, and an inner cladding material that is formed of an Al—Mn—Cu-based alloy, and is higher in potential than the core material, one side of the core material being clad with the inner cladding material, and the other side of the core material being clad with the sacrificial anode material, and the aluminum alloy clad material is formed into a tube so that the inner cladding material defines a refrigerant passage, and the sacrificial anode material comes in contact with the atmosphere, the core material exhibits a sacrificial anode effect on the inner cladding material, and the sacrificial anode material and the core material function as a sacrificial anode layer with respect to the inner cladding material (i.e., the thickness of the sacrificial anode layer increases). Since the inner cladding material that has a higher potential remains even when most of the sacrificial anode material and the core material are consumed due to corrosion, it is possible to suppress the occurrence of a through-hole, and improve the corrosion resistance of the outer side (that comes in contact with the atmosphere) (see FIG. 4).

The invention was conceived as a result of conducting further experiments and studies based on this finding. An object of the invention is to provide an aluminum alloy clad material that can produce a heat exchanger tube that exhibits an excellent outer-side corrosion resistance when formed into a tube, and a heat exchanger that includes a tube obtained by forming the clad material.

Solution to Problem (1) According to one aspect of the invention, an aluminum alloy clad material includes a core material, an inner cladding material, and a sacrificial anode material, one side of the core material being clad with the inner cladding material, the other side of the core material being clad with the sacrificial anode material, the core material being formed of an Al—Mn alloy that includes 0.6 to 2.0% of Mn and 0.4% or less of Cu, with the balance being aluminum and unavoidable impurities, the inner cladding material being formed of an Al—Mn—Cu alloy that includes 0.6 to 2.0% of Mn and 0.2 to 1.5% of Cu, with the balance being aluminum and unavoidable impurities, and the sacrificial anode material being formed of an Al—Zn alloy that includes 0.5 to 10.0% of Zn, with the balance being aluminum and unavoidable impurities. Note that the unit "%" used herein in connection with the content of the alloy component refers to "mass %".
(2) In the aluminum alloy clad material according to (1), the core material may further include either or both of 1.5% or less of Si and 0.7% or less of Fe.
(3) In the aluminum alloy clad material according to (1) or (2), the core material may further include 0.01 to 0.3% of Ti.
(4) In the aluminum alloy clad material according to any one of (1) to (3), the inner cladding material may further include either or both of 1.5% or less of Si and 0.7% or less of Fe.
(5) In the aluminum alloy clad material according to any one of (1) to (4), the inner cladding material may further include 0.01 to 0.3% of Ti.
(6) In the aluminum alloy clad material according to any one of (1) to (5), the sacrificial anode material may further include one or two or more of 1.5% or less of Si, 0.7% or less of Fe, and 1.5% or less of Mn.
(7) In the aluminum alloy clad material according to any one of (1) to (6), the core material may include 0.4% or less of Cu so that the Cu content in the core material is lower than the Cu content in the inner cladding material by 0.2% or more.
(8) In the aluminum alloy clad material according to any one of (1) to (7), the sacrificial anode material may include 1.0 to 4.0% of Zn.
(9) According to another aspect of the invention, a heat exchanger is produced by forming the aluminum alloy clad material according to anyone of (1) to (8) into a tube so that the inner cladding material defines a refrigerant passage, and the sacrificial anode material comes in contact with the atmosphere, assembling an aluminum fin with the tube, and brazing the aluminum fin and the tube.

Advantageous Effects of the Invention

The aspects of the invention thus provide an aluminum alloy clad material that exhibits an excellent outer-side corrosion resistance when formed into a tube, and may suitably be used as a material for forming a tube for a heat exchanger (particularly an automotive heat exchanger), and a heat exchanger that includes a tube obtained by forming the aluminum alloy clad material.

DESCRIPTION OF EMBODIMENTS

Figure 1:
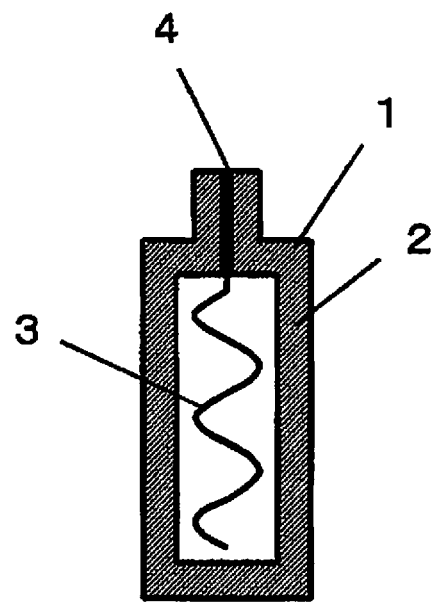
FIG. 1 is a cross-sectional view illustrating an example of a heat exchanger tube obtained by forming an aluminum alloy clad material according to one embodiment of the invention.

An aluminum alloy clad material according to one embodiment of the invention has a three-layer structure that includes a core material, a sacrificial anode material, and an inner cladding material that is higher in potential than the core material, one side of the core material being clad with the inner cladding material, and the other side of the core material being clad with the sacrificial anode material. When the aluminum alloy clad material is formed into a tube so that the inner cladding material defines a refrigerant passage, and the sacrificial anode material comes in contact with the atmosphere, and is assembled into a heat exchanger, the core material exhibits a sacrificial anode effect on the inner cladding material, and the sacrificial anode material and the core material function as a sacrificial anode layer with respect to the inner cladding material (i.e., the thickness of the sacrificial anode layer increases). Since the inner cladding material that has a higher potential remains even when most of the sacrificial anode material and the core material are consumed due to corrosion, it is possible to suppress the occurrence of a through-hole, and improve the corrosion resistance of the outer side (that comes in contact with the atmosphere).

The core material is formed of an Al—Mn alloy that includes 0.6 to 2.0% of Mn and 0.4% or less of Cu, with the balance being aluminum and unavoidable impurities, the inner cladding material is formed of an Al—Mn—Cu alloy that includes 0.6 to 2.0% of Mn and 0.2 to 1.5% of Cu, with the balance being aluminum and unavoidable impurities, and the sacrificial anode material is formed of an Al—Zn alloy that includes 0.5 to 10.0% of Zn, with the balance being aluminum and unavoidable impurities.

The core material may include either or both of 1.5% or less of Si and 0.7% or less of Fe, and may include 0.01 to 0.3% of Ti. The inner cladding material may include either or both of 1.5% or less of Si and 0.7% or less of Fe, and may include 0.01 to 0.3% of Ti. The sacrificial anode material may include one or more of 1.5% or less of Si, 0.7% or less of Fe, and 1.5% or less of Mn. The core material may include 0.4% or less of Cu so that the Cu content in the core material is lower than the Cu content in the inner cladding material by 0.2% or more.

The effects of each alloy component included in the sacrificial anode material, the core material, and the inner cladding material, and the reasons for which the content of each alloy component is limited as described above, are described below.

Sacrificial Anode Material

Zn

Zn included in the sacrificial anode material increases the potential of the sacrificial anode material. Zn is added to the sacrificial anode material in order to adjust the balance in potential with the core material and the inner cladding material. The Zn content is preferably 0.5 to 10.0%. If the Zn content is less than 0.5%, a sufficient effect may not be obtained. If the Zn content exceeds 10.0%, the self-corrosion rate may increase, and the corrosion-proof lifetime may decrease. The Zn content is more preferably 1.0 to 7.0%, and still more preferably 1.0 to 4.0%.

Si

Si improves the strength of the sacrificial anode material. The Si content is preferably 1.5% or less. If the Si content exceeds 1.5%, the self-corrosion rate may increase. The Si content is more preferably 0.5% or less. If the Si content is less than 0.05%, the effect of improving the strength of the sacrificial anode material may be insufficient.

Fe

Fe improves the strength of the sacrificial anode material. The Fe content is preferably 0.7% or less. If the Fe content exceeds 0.7%, the self-corrosion rate may increase. If the Fe content is less than 0.05%, the effect of improving the strength of the sacrificial anode material may be insufficient.

Mn

Mn improves the strength of the sacrificial anode material. The Mn content is preferably 1.5% or less. If the Mn content exceeds 1.5%, the self-corrosion rate may increase. The Mn content is more preferably 0.5% or less. If the Mn content is less than 0.1%, the effect of improving the strength of the sacrificial anode material may be insufficient. Note that the advantageous effects of the invention are not impaired even if the sacrificial anode material includes 0.3% or less of In, 0.3% or less of Sn, 0.3% or less of Ti, 0.3% or less of V, 0.3% or less of Cr, 0.3% or less of Zr, and 0.3% or less of B.

Core Material

Mn

Mn improves the strength of the core material. The Mn content is preferably 0.6 to 2.0%. If the Mn content is less than 0.6%, a sufficient effect may not be obtained. If the Mn content exceeds 2.0%, it may be difficult to roll the material. The Mn content is more preferably 1.0 to 2.0%.

Si

Si improves the strength of the core material. The Si content is preferably 1.5% or less. If the Si content exceeds 1.5%, the melting point of the core material may decrease, and the core material may be easily melted during brazing. The Si content is more preferably 0.8% or less. If the Si content is less than 0.05%, the effect of improving the strength of the core material may be insufficient.

Fe

Fe improves the strength of the core material. The Fe content is preferably 0.7% or less. If the Fe content exceeds 0.7%, the self-corrosion rate may increase. If the Fe content is less than 0.05%, the effect of improving the strength of the core material may be insufficient.

Ti

Ti is separated into a high-concentration area and a low-concentration area in the thickness direction of the core material. These areas are distributed alternately in layers. Since the low-concentration area is preferentially corroded as compared with the high-concentration area, corrosion occurs in layers. This prevents the progress of corrosion in the thickness direction, and improves the corrosion resistance of the core material. The Ti content is preferably 0.01 to 0.3%. If the Ti content is less than 0.01%, a sufficient effect may not be obtained. If the Ti content exceeds 0.3%, a large crystallized product may be produced, and formability may deteriorate.

Cu

Cu increases the potential of the core material. Cu may be added to the core material in order to adjust the balance in potential with the inner cladding material. Cu included in the core material is diffused into the sacrificial anode material during brazing to reduce the potential difference between the core material and the sacrificial anode material, and increase the corrosion rate of the core material. Therefore, the Cu content is preferably 0.4% or less. If the difference between the Cu content in the core material and the Cu content in the inner cladding material is less than 0.2%, it may be difficult to provide a potential difference between the inner cladding material and the core material. Therefore, it is preferable that the Cu content in the core material be lower than the Cu content in the inner cladding material by 0.2% or more. The Cu content is more preferably less than 0.05%. Note that the advantageous effects of the invention are not impaired even if the core material includes 0.3% or less of V, 0.3% or less of Cr, 0.3% or less of Zr, and 0.3% or less of B.

Inner Cladding Material

Mn

Mn improves the strength of the inner cladding material. The Mn content is preferably 0.6 to 2.0%. If the Mn content is less than 0.6%, a sufficient effect may not be obtained. If the Mn content exceeds 2.0%, it may be difficult to roll the material. The Mn content is more preferably 1.0 to 2.0%.

Si

Si improves the strength of the inner cladding material. The Si content is preferably 1.5% or less. If the Si content exceeds 1.5%, the melting point of the inner cladding material may decrease, and the inner cladding material may be easily melted during brazing. If the Si content is less than 0.05%, the effect of improving the strength of the inner cladding material may be insufficient.

Fe

Fe improves the strength of the inner cladding material. The Fe content is preferably 0.7% or less. If the Fe content exceeds 0.7%, the self-corrosion rate may increase. If the Fe content is less than 0.05%, the effect of improving the strength of the inner cladding material may be insufficient.

Cu

Cu increases the potential of the inner cladding material. Cu is added to the inner cladding material in order to adjust the balance in potential with the core material. The Cu content is preferably 0.2 to 1.5%. If the Cu content is less than 0.2%, a sufficient effect may not be obtained. If the Cu content exceeds 1.5%, the melting point of the inner cladding material may decrease, and the inner cladding material may easily melt during brazing. The Cu content is more preferably 0.2 to 0.8%.

Ti

Ti is separated into a high-concentration area and a low-concentration area in the thickness direction of the inner cladding material. These areas are distributed alternately in layers. Since the low-concentration area is preferentially corroded as compared with the high-concentration area, corrosion occurs in layers. This prevents the progress of corrosion in the thickness direction, and improves the corrosion resistance of the inner cladding material. The Ti content is preferably 0.01 to 0.3%. If the Ti content is less than 0.01%, a sufficient effect may not be obtained. If the Ti content exceeds 0.3%, a large crystallized product may be produced, and formability may deteriorate. Note that the advantageous effects of the invention are not impaired even if the inner cladding material includes 0.3% or less of V, 0.3% or less of Cr, 0.3% or less of Zr, and 0.3% or less of B.

Note that it undesirable to limit the Si content and the Fe content in the sacrificial anode material, the core material, and the inner cladding material to less than 0.03% since the production cost increases when a high-purity ground metal is used.

It is preferable to set the cladding ratio of the sacrificial anode material to 5 to 30%, and set the cladding ratio of the inner cladding material to 5 to 30%. If the cladding ratio of the sacrificial anode material is less than 5%, the Zn concentration in the sacrificial anode material may decrease due to diffusion during brazing, and a sufficient sacrificial anode effect may not be obtained. If the cladding ratio of the sacrificial anode material exceeds 30%, it may be difficult to implement clad rolling. The cladding ratio of the sacrificial anode material is more preferably 10 to 30%. If the cladding ratio of the inner cladding material is less than 5%, the Cu concentration in the inner cladding material may decrease due to diffusion during brazing, and the potential difference between the inner cladding material and the core material may decrease, whereby it may be difficult for the core material to exhibit a sacrificial anode effect. If the cladding ratio of the inner cladding material exceeds 30%, it may be difficult to implement clad rolling. The cladding ratio of the inner cladding material is more preferably 10 to 30%.

A heat exchanger is produced by forming the aluminum alloy clad material into a tube so that the inner cladding material defines a refrigerant passage, and the sacrificial anode material comes in contact with the atmosphere, assembling an aluminum fin with the outer side (that comes in contact with the atmosphere) of the tube, or the outer side and the inner side (that defines the refrigerant passage) of the tube, and brazing the aluminum fin and the tube.

Figure 2:
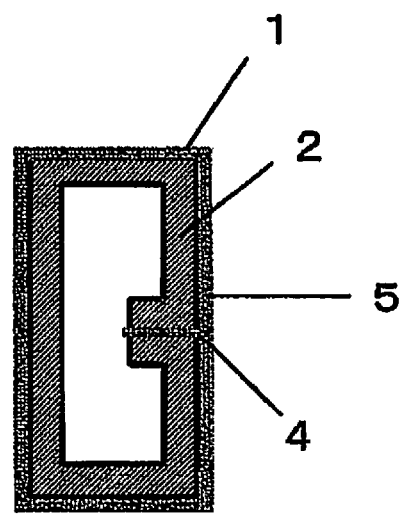
FIG. 2 is a cross-sectional view illustrating another example of a heat exchanger tube obtained by forming an aluminum alloy clad material according to one embodiment of the invention.
Figure 3:
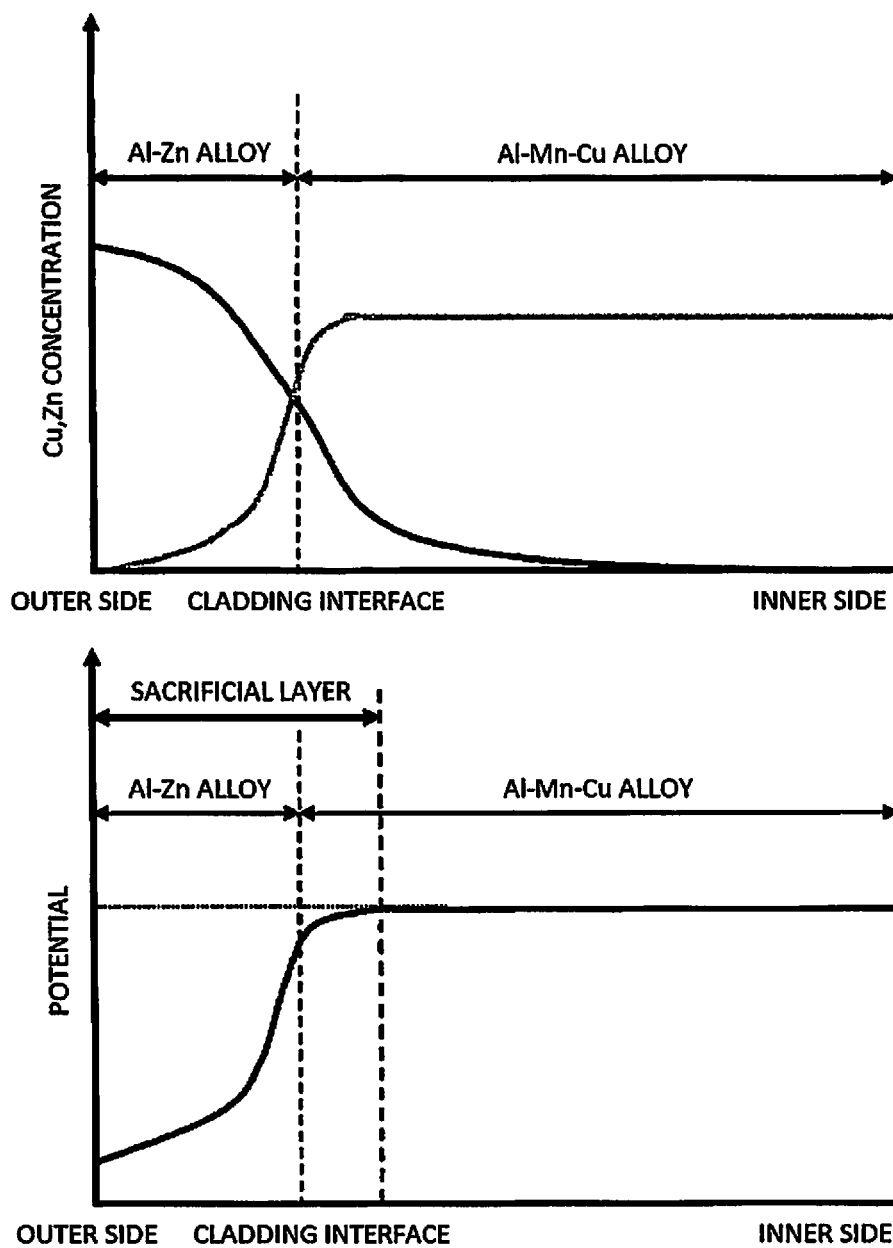
FIG. 3 is a view illustrating the diffusion state of Zn from a sacrificial anode material (Al—Zn alloy) after brazing, the diffusion state of Cu from a core material (Al—Mn—Cu-based alloy) after brazing, and the potential distribution.
Figure 4:
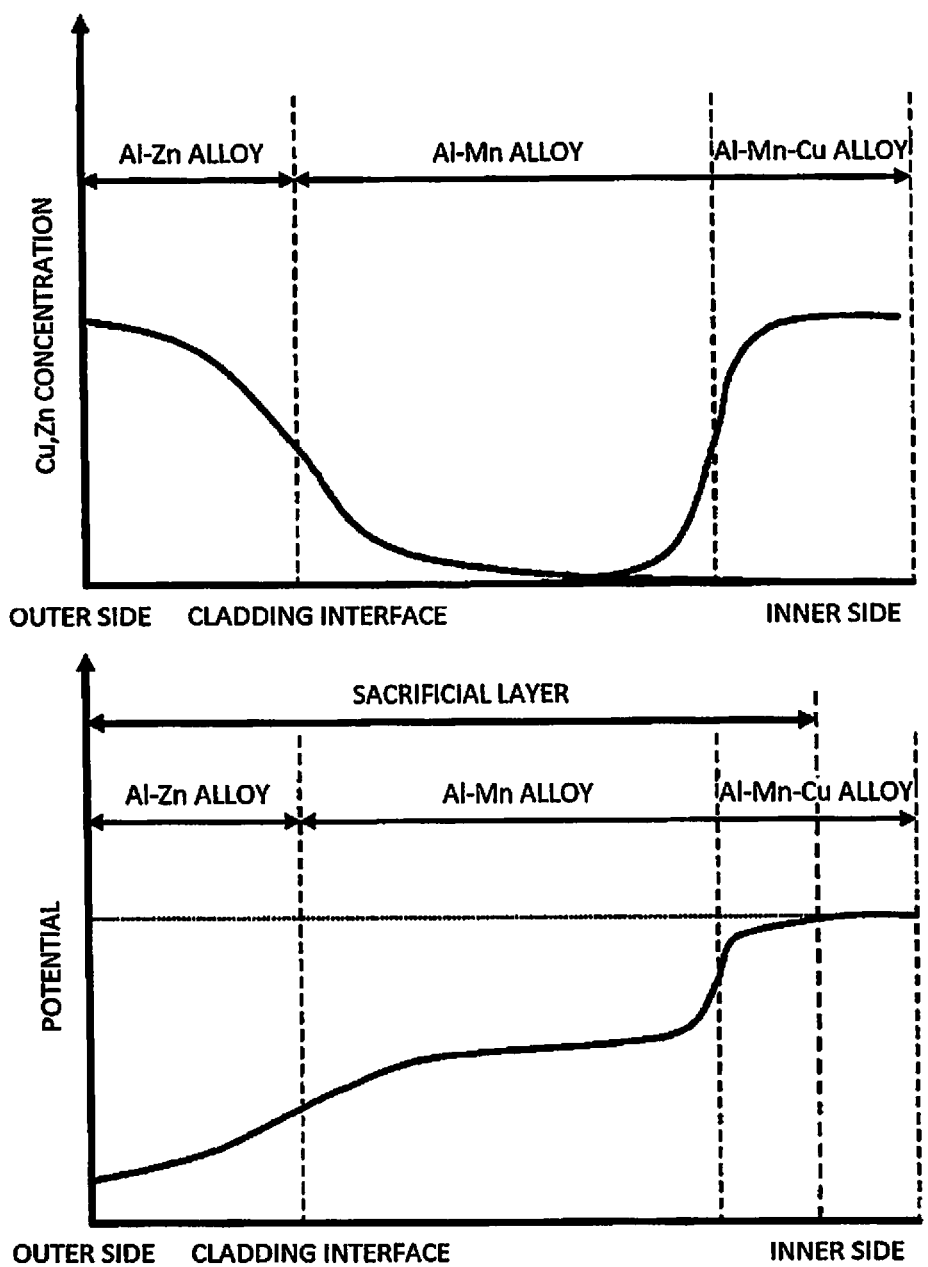
FIG. 4 is a view illustrating the diffusion state of Zn from a sacrificial anode material (Al—Zn alloy) after brazing, the diffusion state of Cu from a core material (Al—Mn—Cu-based alloy) and an inner cladding material layer after brazing, and the potential distribution.

As illustrated in FIG. 1, a tube material 1 may be produced by forming an aluminum alloy clad material 2 into a tube, inserting an inner fin 3 that is formed of a brazing sheet provided with a filler metal on each side, and brazing a joint 4 of the tube utilizing the filler metal provided to the inner fin 3. As illustrated in FIG. 2, the tube material 1 may also be produced by forming the aluminum alloy clad material 2 into a tube after applying a filler metal paste 5 to the sacrificial anode material of the aluminum alloy clad material 2 (or applying the filler metal paste 5 to the sacrificial anode material of the aluminum alloy clad material 2 after forming the aluminum alloy clad material 2 into a tube), and brazing the joint 4 utilizing the filler metal paste 5.

When a heat exchanger is produced by forming the aluminum alloy clad material into a tube so that the inner cladding material defines a refrigerant passage, and the sacrificial anode material comes in contact with the atmosphere (defines the outer side), assembling an aluminum fin with the tube, and brazing the aluminum fin and the tube at 600° C. for 3 minutes, the potential of the sacrificial anode material, the potential of the core material, and the potential of the inner cladding material included in the tube have the relationship "potential of sacrificial anode material<potential of core material<potential of the inner cladding material". Since the sacrificial anode material exhibits a sacrificial anode effect on the core material, and the core material exhibits a sacrificial anode effect on the inner cladding material, the sacrificial anode material and the core material function as a sacrificial anode layer with respect to the inner cladding material (i.e., the thickness of the sacrificial anode layer increases). Since the inner cladding material that has a higher potential remains even when most of the sacrificial anode material and the core material are consumed due to corrosion, it is possible to suppress the occurrence of a through-hole, and improve the corrosion resistance of the outer side (that comes in contact with the atmosphere).

EXAMPLES

The invention is further described below by way of examples and comparative examples to demonstrate the advantageous effects of the invention. Note that the following examples are for illustration purposes only, and the invention is not limited to the following examples.

Example 1

An ingot of a sacrificial anode material alloy (S1 to S11) having the composition shown in Table 1, and ingots of a core material alloy and an inner cladding material alloy (C1 to C19, C25 to C27) having the composition shown in Table 2, were cast using a semi-continuous casting method. The ingot of the sacrificial anode material alloy was homogenized at 500° C. for 8 hours, and hot-rolled (start temperature: 500° C.) to a given thickness. The ingot of the core material alloy was homogenized at 500° C. for 8 hours, and machined. The ingot of the inner cladding material alloy was homogenized at 500° C. for 8 hours, and hot-rolled (start temperature: 500° C.) to a given thickness.

The hot-rolled material of the sacrificial anode material alloy and the hot-rolled material of the inner cladding material alloy were machined. The aluminum alloys were stacked in the combination shown in Table 3, hot-rolled (start temperature: 500° C.) to a thickness of 3 mm, cold-rolled, subjected to process annealing at 400° C., and then cold-rolled to obtain an aluminum alloy clad sheet material (specimens 1 to 28) having a thickness of 0.2 mm.

Comparative Example 1

An ingot of a sacrificial anode material alloy (S12 to S16) having the composition shown in Table 1, and ingots of a core material alloy and an inner cladding material alloy (C20 to C24) having the composition shown in Table 2, were cast using a semi-continuous casting method. The ingot of the sacrificial anode material alloy (S1), and the ingots of the core material alloy and the inner cladding material alloy (C1, C9, C25) that were cast in Example 1 were also used in Comparative Example 1. The ingot of the sacrificial anode material alloy was homogenized at 500° C. for 8 hours, and hot-rolled (start temperature: 500° C.) to a given thickness. The ingot of the core material alloy was homogenized at 500° C. for 8 hours, and machined. The ingot of the inner cladding material alloy was homogenized at 500° C. for 8 hours, and hot-rolled (start temperature: 500° C.) to a given thickness. In Tables 1 and 2, the values that fall outside the scope of the invention are underlined.

The hot-rolled material of the sacrificial anode material alloy and the hot-rolled material of the inner cladding material alloy were cut to given dimensions. The aluminum alloys were stacked in the combination shown in Table 4, hot-rolled (start temperature: 500° C.) to a thickness of 3 mm, cold-rolled, subjected to process annealing at 400° C., and then cold-rolled to obtain an aluminum alloy clad sheet material (specimens 101 to 112) having a thickness of 0.2 mm.

The resulting specimen was heated at 600° C. for 3 minutes (equivalent to the brazing conditions), and subjected to potential measurement, a tensile test, and a corrosion test as described below. The results are shown in Tables 3 and 4.

Potential Measurement

The potential of the specimen was measured at room temperature in a 5% NaCl aqueous solution for which the pH was adjusted to 3 using acetic acid. The potential of the sacrificial anode material was measured in a state in which the area other than the surface of the sacrificial anode material was masked, and the potential of the inner cladding material was measured in a state in which the area other than the surface of the inner cladding material was masked. When measuring the potential of the core material, the specimen was ground from the sacrificial anode material so that the center of the core material was exposed, and the potential of the core material was measured in a state in which the area other than the exposed core material was masked.

Tensile Test

A JIS-5 specimen was prepared using the resulting specimen, and subjected to a tensile test in accordance with JIS Z 2241. A case where the tensile strength of the specimen was 95 MPa or more (equivalent to the strength of a 3003 alloy 0-material) was determined to be acceptable.

Corrosion Test

The specimen that was masked so that the sacrificial anode material was exposed, was subjected to a SWAAT test (ASTM G85) to evaluate corrosion resistance. A case where a through-hole was not observed when 1200 hours had elapsed, and the corrosion depth was less than 0.10 mm was evaluated as "Very good", a case where a through-hole was not observed when 1200 hours had elapsed, and the corrosion depth was 0.10 mm or more was evaluated as "Good", and a case where a through-hole occurred before 1200 hours elapsed was evaluated as "Poor".

TABLE 1

| No. | Component (mass %) | | | | | Al |
|---|---|---|---|---|---|---|
| | Si | Fe | Mn | Zn | Other | |
| S1 | 0.1 | 0.3 | 0.0 | 2.5 | | Balance |
| S2 | 0.1 | 0.2 | 0.0 | 0.6 | | Balance |
| S3 | 0.1 | 0.3 | 0.0 | 1.2 | | Balance |
| S4 | 0.1 | 0.2 | 0.0 | 6.5 | | Balance |
| S5 | 0.1 | 0.2 | 0.0 | 9.7 | | Balance |
| S6 | 0.4 | 0.1 | 0.0 | 2.0 | | Balance |
| S7 | 0.2 | 0.5 | 0.0 | 2.0 | | Balance |
| S8 | 0.1 | 0.1 | 0.5 | 2.5 | | Balance |
| S9 | 1.2 | 0.0 | 0.2 | 3.8 | | Balance |
| S10 | 0.2 | 0.2 | 0.0 | 2.0 | Ti: 0.05, Cr: 0.05, V: 0.05, B: 0.05 | Balance |
| S11 | 0.2 | 0.2 | 1.4 | 1.5 | Sn: 0.01, In: 0.01 | Balance |

TABLE 1-continued

| No. | Component (mass %) | | | | | Al |
|---|---|---|---|---|---|---|
| | Si | Fe | Mn | Zn | Other | |
| S12 | 2.0 | 0.1 | 0.2 | 3.0 | | Balance |
| S13 | 0.4 | 1.0 | 0.4 | 4.5 | | Balance |
| S14 | 0.4 | 0.3 | 2.0 | 5.0 | | Balance |
| S15 | 0.5 | 0.4 | 0.5 | 0.1 | | Balance |
| S16 | 0.3 | 0.2 | 0.2 | 11.6 | | Balance |

TABLE 2

| No. | Component (mass %) | | | | | Al |
|---|---|---|---|---|---|---|
| | Si | Fe | Cu | Mn | Other | |
| C1 | 0.7 | 0.1 | 0.0 | 1.5 | | Balance |
| C2 | 0.6 | 0.1 | 0.0 | 0.6 | | Balance |
| C3 | 0.1 | 0.1 | 0.0 | 1.2 | | Balance |
| C4 | 0.1 | 0.1 | 0.0 | 2.0 | | Balance |
| C5 | 1.3 | 0.1 | 0.0 | 1.2 | | Balance |
| C6 | 0.2 | 0.6 | 0.0 | 1.2 | | Balance |
| C7 | 0.2 | 0.2 | 0.0 | 1.2 | Ti: 0.2 | Balance |
| C8 | 0.7 | 0.2 | 0.0 | 1.2 | Cr: 0.05, V: 0.05, B: 0.05 | Balance |
| C9 | 0.7 | 0.1 | 0.6 | 1.5 | | Balance |
| C10 | 0.6 | 0.1 | 0.3 | 0.7 | | Balance |
| C11 | 0.2 | 0.2 | 0.4 | 1.2 | | Balance |
| C12 | 0.2 | 0.2 | 0.6 | 1.2 | | Balance |
| C13 | 0.2 | 0.2 | 1.0 | 1.2 | | Balance |
| C14 | 0.2 | 0.2 | 0.3 | 2.0 | | Balance |
| C15 | 1.3 | 0.2 | 0.2 | 1.0 | | Balance |
| C16 | 0.2 | 0.2 | 1.4 | 1.2 | | Balance |
| C17 | 0.7 | 0.2 | 0.8 | 1.2 | | Balance |
| C18 | 0.2 | 0.5 | 0.3 | 1.2 | Ti: 0.2 | Balance |
| C19 | 0.4 | 0.2 | 0.6 | 1.2 | Cr: 0.05, V: 0.05, B: 0.05 | Balance |
| C20 | 2.0 | 0.3 | 0.0 | 1.2 | | Balance |
| C21 | 0.5 | 1.0 | 0.2 | 1.3 | | Balance |
| C22 | 0.4 | 0.4 | 0.2 | 0.3 | | Balance |
| C23 | 0.9 | 0.3 | 2.0 | 1.2 | | Balance |
| C24 | 0.4 | 0.5 | 1.2 | 2.5 | | Balance |
| C25 | 0.2 | 0.2 | 0.5 | 1.2 | | Balance |
| C26 | 0.5 | 0.3 | 0.03 | 1.5 | | Balance |
| C27 | 0.3 | 0.3 | 0.1 | 1.2 | | Balance |

TABLE 3

| Specimen No. | Specimen | | | | | Potential (mV vs SCE) | | | Tensile strength (MPa) | SWAAT test | |
|---|---|---|---|---|---|---|---|---|---|---|---|
| | Sacrificial anode material | | Core material No. | Inner cladding material | | Sacrificial anode material | Core material | Inner cladding material | | Corrosion depth (mm) | Evaluation |
| | No. | Cladding ratio (%) | | No. | Cladding ratio (%) | | | | | | |
| 1 | S1 | 10 | C1 | C9 | 20 | −800 | −690 | −650 | 140 | <0.10 | Very good |
| 2 | S1 | 20 | C1 | C9 | 10 | −850 | −690 | −650 | 130 | <0.10 | Very good |
| 3 | S1 | 20 | C1 | C9 | 20 | −850 | −690 | −650 | 135 | <0.10 | Very good |
| 4 | S2 | 20 | C1 | C9 | 20 | −730 | −690 | −650 | 135 | <0.10 | Very good |
| 5 | S3 | 20 | C1 | C9 | 20 | −770 | −690 | −650 | 135 | <0.10 | Very good |
| 6 | S4 | 20 | C1 | C9 | 20 | −915 | −690 | −650 | 135 | <0.10 | Very good |
| 7 | S5 | 20 | C1 | C9 | 20 | −930 | −690 | −650 | 135 | <0.10 | Very good |
| 8 | S6 | 20 | C1 | C9 | 20 | −830 | −690 | −650 | 135 | <0.10 | Very good |
| 9 | S7 | 20 | C1 | C9 | 20 | −830 | −690 | −650 | 140 | <0.10 | Very good |
| 10 | S8 | 20 | C1 | C9 | 20 | −840 | −690 | −650 | 140 | <0.10 | Very good |
| 11 | S9 | 20 | C1 | C9 | 20 | −860 | −690 | −650 | 140 | <0.10 | Very good |
| 12 | S10 | 20 | C1 | C9 | 20 | −840 | −690 | −650 | 135 | <0.10 | Very good |
| 13 | S11 | 20 | C1 | C9 | 20 | −900 | −690 | −650 | 140 | <0.10 | Very good |
| 14 | S1 | 20 | C2 | C10 | 20 | −850 | −700 | −670 | 100 | <0.10 | Very good |
| 15 | S1 | 20 | C3 | C11 | 20 | −850 | −700 | −670 | 110 | <0.10 | Very good |
| 16 | S1 | 20 | C4 | C12 | 20 | −850 | −700 | −650 | 115 | <0.10 | Very good |
| 17 | S1 | 20 | C5 | C13 | 20 | −850 | −690 | −640 | 135 | <0.10 | Very good |
| 18 | S1 | 20 | C6 | C14 | 20 | −850 | −700 | −670 | 130 | <0.10 | Very good |
| 19 | S1 | 20 | C7 | C15 | 20 | −850 | −700 | −670 | 130 | <0.10 | Very good |
| 20 | S1 | 20 | C8 | C16 | 20 | −850 | −690 | −610 | 135 | <0.10 | Very good |

TABLE 3-continued

| Specimen No. | Sacrificial anode material No. | Cladding ratio (%) | Core material No. | Inner cladding material No. | Cladding ratio (%) | Potential (mV vs SCE) Sacrificial anode material | Core material | Inner cladding material | Tensile strength (MPa) | SWAAT test Corrosion depth (mm) | Evaluation |
|---|---|---|---|---|---|---|---|---|---|---|---|
| 21 | S1 | 20 | C1 | C17 | 20 | −850 | −690 | −645 | 135 | <0.10 | Very good |
| 22 | S1 | 20 | C1 | C18 | 20 | −850 | −690 | −670 | 135 | <0.10 | Very good |
| 23 | S1 | 20 | C1 | C19 | 20 | −850 | −690 | −670 | 135 | <0.10 | Very good |
| 24 | S1 | 20 | C10 | C9 | 20 | −850 | −670 | −650 | 145 | 0.12 | Good |
| 25 | S1 | 20 | C11 | C9 | 20 | −850 | −670 | −650 | 145 | 0.13 | Good |
| 26 | S1 | 20 | C11 | C25 | 20 | −850 | −670 | −655 | 145 | 0.16 | Good |
| 27 | S1 | 20 | C26 | C9 | 20 | −850 | −690 | −650 | 135 | <0.10 | Very good |
| 28 | S1 | 20 | C27 | C9 | 20 | −850 | −685 | −650 | 140 | 0.10 | Good |

TABLE 4

| Specimen No. | Sacrificial anode material No. | Cladding ratio (%) | Core material No. | Inner cladding material No. | Cladding ratio (%) | Potential (mV vs SCE) Sacrificial anode material | Core material | Inner cladding material | Tensile strength (MPa) | SWAAT test Corrosion depth (mm) | Evaluation |
|---|---|---|---|---|---|---|---|---|---|---|---|
| 101 | S12 | 20 | C1 | C9 | 20 | −840 | −690 | −650 | 135 | Through-hole occurred | Poor |
| 102 | S13 | 20 | C1 | C9 | 20 | −870 | −690 | −650 | 135 | Through-hole occurred | Poor |
| 103 | S14 | 20 | C1 | C9 | 20 | −880 | −690 | −650 | 135 | Through-hole occurred | Poor |
| 104 | S15 | 20 | C1 | C9 | 20 | −700 | −690 | −650 | 135 | Through-hole occurred | Poor |
| 105 | S16 | 20 | C1 | C9 | 20 | −940 | −690 | −650 | 135 | Through-hole occurred | Poor |
| 106 | S1 | 20 | C20 | C9 | 20 | | Core material melted | | | | |
| 107 | S1 | 20 | C21 | C9 | 20 | −850 | −680 | −650 | 145 | Through-hole occurred | Poor |
| 108 | S1 | 20 | C22 | C9 | 20 | −850 | −680 | −650 | 90 | 0.12 | Good |
| 109 | S1 | 20 | C1 | C23 | 20 | | Inner cladding material melted | | | | |
| 110 | S1 | 20 | C1 | C24 | 20 | | Rolling cracks occurred | | | | |
| 111 | S1 | 10 | C1 | — | — | −800 | −690 | — | 135 | Through-hole occurred | Poor |
| 112 | S1 | 20 | C25 | C9 | 20 | −850 | −660 | −650 | 145 | Through-hole occurred | Poor |

As shown in Table 3, specimens No. 1 to No. 28 according to the invention satisfied the relationship "potential of sacrificial anode material<potential of core material<potential of the inner cladding material", and a through-hole did not occur during the SWAAT test. When a heat exchanger was produced by forming the aluminum alloy clad material into a tube so that the inner cladding material defines a refrigerant passage, and the sacrificial anode material comes in contact with the atmosphere (situated on the outer side), assembling an aluminum fin with the tube, and brazing the aluminum fin and the tube at 600° C. for 3 minutes, the outer side (that comes in contact with the atmosphere) of the tube exhibited an improved corrosion resistance.

As shown in Table 4, the amount of self-corrosion of the sacrificial anode material increased, and a through-hole occurred during the SWAAT test when the Si content in the sacrificial anode material was too high (specimen No. 101), when the Fe content in the sacrificial anode material was too high (specimen No. 102), or when the Mn content in the sacrificial anode material was too high (specimen No. 103). Regarding specimen No. 104, the sacrificial anode effect of the sacrificial anode material was insufficient since the Zn content in the sacrificial anode material was too low, and a through-hole occurred during the SWAAT test. Regarding specimen No. 105, the amount of self-corrosion of the sacrificial anode material increased since the Zn content in the sacrificial anode material was too high, and a through-hole occurred during the SWAAT test.

Regarding specimen No. 106, the core material melted during brazing since the Si content in the core material was too high. Regarding specimen No. 107, the amount of self-corrosion of the core material increased since the Fe content in the core material was high, and a through-hole occurred during the SWAAT test. Specimen No. 108 exhibited a low tensile strength since the Mn content in the core material was too low.

Regarding specimen No. 109, the inner cladding material melted during brazing since the Cu content in the inner cladding material was too high. Regarding specimen No. 110, cracks occurred during cold rolling since the Mn content in the inner cladding material was too high, and a sound clad material could not be obtained. Specimen No.

111 corresponds to a known aluminum alloy clad material that consists only of the core material and the sacrificial anode material, and a through-hole occurred during the SWAAT test. Regarding specimen No. 112, the potential difference between the core material and the sacrificial anode material decreased since the Cu content in the core material was higher than 0.4%, and the potential difference between the core material and the inner cladding material was insufficient since the difference between the Cu content in the core material and the Cu content in the inner cladding material was less than 0.2%. As a result, a through-hole occurred during the SWAAT test.

REFERENCE SIGNS LIST

1 Tube material
2 Aluminum alloy clad material
3 Inner fin
4 Joint
5 Filler metal paste

The invention claimed is:

1. An aluminum alloy clad material comprising a core material, an inner cladding material, and a sacrificial anode material, one side of the core material being clad with the inner cladding material, the other side of the core material being clad with the sacrificial anode material, the core material being formed of an Al—Mn alloy that consists of 0.6 to 2.0 mass % of Mn and 0.4 mass % or less of Cu, optionally, one or more of 0.01 to 0.3 mass % of Ti, 1.5 mass % or less of Si and 0.7 mass % or less of Fe, with the balance being aluminum and unavoidable impurities, the inner cladding material being formed of an Al—Mn—Cu alloy that comprises 0.6 to 2.0 mass % of Mn and 0.2 to 1.5 mass % of Cu, with the balance being aluminum and unavoidable impurities, and the sacrificial anode material being formed of an Al—Zn alloy that comprises 0.5 to 10.0 mass % of Zn, with the balance being aluminum and unavoidable impurities.

2. The aluminum alloy clad material according to claim 1, wherein the core material further contains one or more of 0.01 to 0.3 mass % of Ti, 1.5 mass % or less of Si and 0.7 mass % or less of Fe.

3. The aluminum alloy clad material according to claim 1, wherein the inner cladding material further comprises one or more of 0.01 to 0.3 mass % of Ti, 1.5 mass % or less of Si and 0.7 mass % or less of Fe.

4. The aluminum alloy clad material according to claim 1, wherein the sacrificial anode material further comprises 1.0 to 4.0 mass % of Zn, and one or more of 1.5 mass % or less of Si, 0.7 mass % or less of Fe, and 1.5 mass % or less of Mn.

5. The aluminum alloy clad material according to claim 1, wherein the core material further contains 0.4 mass % or less of Cu so that the Cu content in the core material is lower than the Cu content in the inner cladding material by 0.2 mass % or more.

6. The aluminum alloy clad material according to claim 2, wherein the inner cladding material further comprises one or more of 0.01 to 0.3 mass % of Ti, 1.5 mass % or less of Si and 0.7 mass % or less of Fe.

7. The aluminum alloy clad material according to claim 2, wherein the sacrificial anode material further comprises 1.0 to 4.0 mass % of Zn, and one or more of 1.5 mass % or less of Si, 0.7 mass % or less of Fe, and 1.5 mass % or less of Mn.

8. The aluminum alloy clad material according to claim 2, wherein the core material further contains 0.4 mass % or less of Cu so that the Cu content in the core material is lower than the Cu content in the inner cladding material by 0.2 mass % or more.

9. The aluminum alloy clad material according to claim 3, wherein the sacrificial anode material further comprises 1.0 to 4.0 mass % of Zn, and one or more of 1.5 mass % or less of Si, 0.7 mass % or less of Fe, and 1.5 mass % or less of Mn.

10. The aluminum alloy clad material according to claim 3, wherein the core material further contains 0.4 mass % or less of Cu so that the Cu content in the core material is lower than the Cu content in the inner cladding material by 0.2 mass % or more.

11. The aluminum alloy clad material according to claim 4, wherein the core material further contains 0.4 mass % or less of Cu so that the Cu content in the core material is lower than the Cu content in the inner cladding material by 0.2 mass % or more.

12. The aluminum alloy clad material according to claim 6, wherein the sacrificial anode material further comprises 1.0 to 4.0 mass % of Zn, and one or more of 1.5 mass % or less of Si, 0.7 mass % or less of Fe, and 1.5 mass % or less of Mn.

13. The aluminum alloy clad material according to claim 6, wherein the core material further contains 0.4 mass % or less of Cu so that the Cu content in the core material is lower than the Cu content in the inner cladding material by 0.2 mass % or more.

14. The aluminum alloy clad material according to claim 7, wherein the core material further contains 0.4 mass % or less of Cu so that the Cu content in the core material is lower than the Cu content in the inner cladding material by 0.2 mass % or more.

15. The aluminum alloy clad material according to claim 9, wherein the core material further contains 0.4 mass % or less of Cu so that the Cu content in the core material is lower than the Cu content in the inner cladding material by 0.2 mass % or more.

16. The aluminum alloy clad material according to claim 12, wherein the core material further contains 0.4 mass % or less of Cu so that the Cu content in the core material is lower than the Cu content in the inner cladding material by 0.2 mass % or more.

17. A heat exchanger produced by forming the aluminum alloy clad material according to claim 1 into a tube so that the inner cladding material defines a refrigerant passage, and the sacrificial anode material comes in contact with the atmosphere, assembling an aluminum fin with the tube, and brazing the aluminum fin and the tube.

* * * * *